United States Patent [19]
Yoshino

[11] Patent Number: 4,920,252
[45] Date of Patent: Apr. 24, 1990

[54] TEMPERATURE CONTROL METHOD FOR DISTRIBUTING POWER TO A PLURALITY OF HEATING ELEMENTS

[75] Inventor: Tatsuo Yoshino, Kanagawa, Japan

[73] Assignee: Fuji Photo Film Co., Ltd., Kanagawa, Japan

[21] Appl. No.: 270,589

[22] Filed: Nov. 14, 1988

[30] Foreign Application Priority Data

Feb. 5, 1988 [JP] Japan .................................. 63-25333

[51] Int. Cl.[5] .............................................. H05B 1/02
[52] U.S. Cl. .................................... 219/497; 219/485; 219/486; 219/492; 307/39; 307/41
[58] Field of Search ............... 219/494, 485, 497, 501, 219/505, 507, 509, 330, 483, 486, 331, 491; 307/117, 38-41; 323/235, 236, 319

[56] References Cited

U.S. PATENT DOCUMENTS 4,010,410  3/1977  Forman ................................ 219/486
4,160,153  7/1979  Melander ............................. 219/486
4,334,147  6/1982  Payne .................................. 219/486
4,362,924  12/1982  Story et al. ......................... 219/497
4,447,712  5/1984  Covillion ............................. 219/486

Primary Examiner—M. H. Paschall
Attorney, Agent, or Firm—Sughrue, Mion, Zinn, Macpeak & Seas

[57] ABSTRACT

A temperature control method is provided which is capable of carrying out a more efficient temperature control through an impartial starting of a plurality of temperature control objects such as the respective heating elements in the liquid tank portion and the drying portion of a developing device for photosensitive material. According to the method of the present invention, a required actuating time is allocated for each of the heating elements within one cycle of a predetermined length of time. As a result, it is possible to supply the required energy for each of the heating elements in a well-balanced manner.

6 Claims, 10 Drawing Sheets

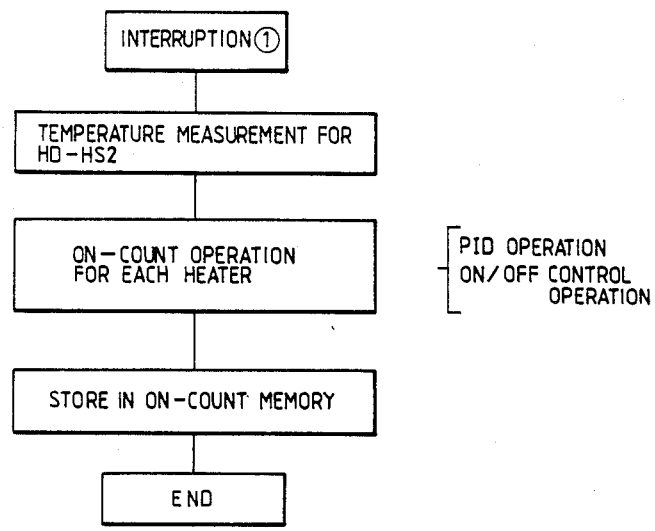
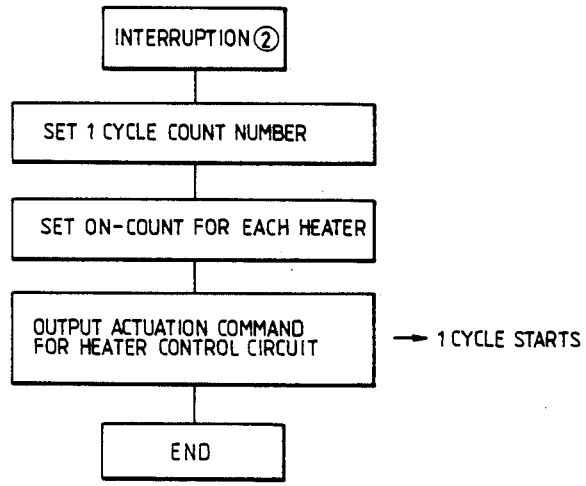

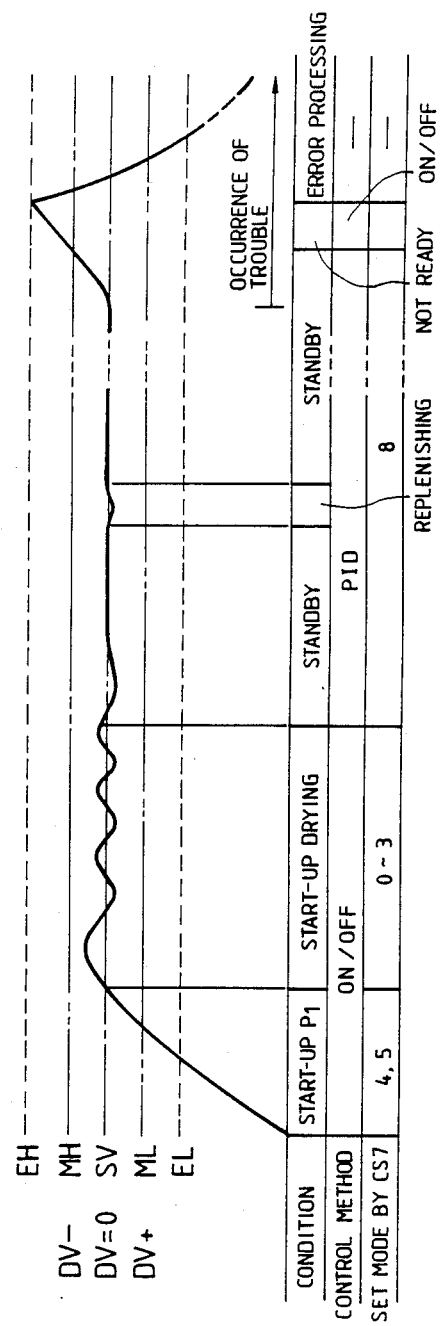

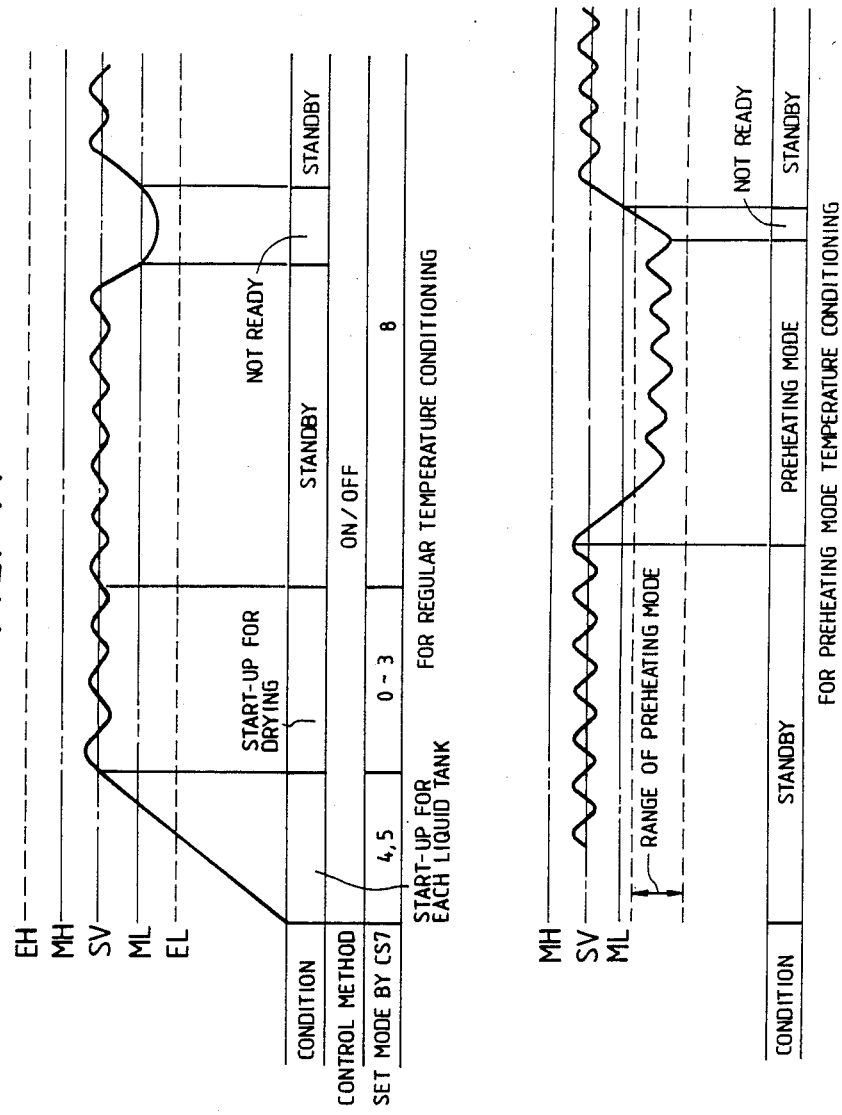

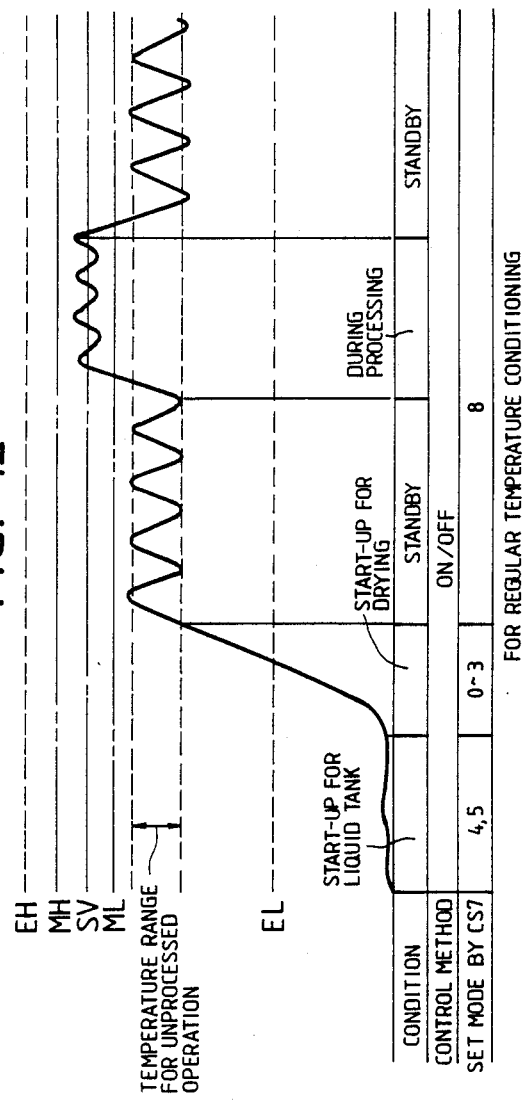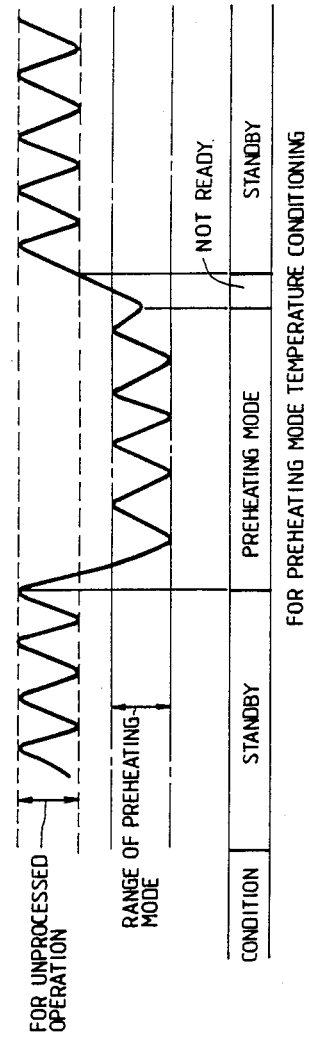
FIG. 12

TEMPERATURE CONTROL METHOD FOR DISTRIBUTING POWER TO A PLURALITY OF HEATING ELEMENTS

BACKGROUND OF THE INVENTION

The present invention relates particularly to a developing device for carrying out a wet processing utilizing a silver halide photosensitive material or the like, or to an image recording device or the like which includes such a developing device.

Various kinds of automatic developing machines utilizing a silver halide photosensitive material and copying machines which include such an automatic developing machine and an exposure device have so far been developed.

Such an automatic developing machine is equipped with a liquid tank portion consisting of a developing tank, a bleaching and fixing tank, and a water washing tank; and a drying portion for carrying out drying after wet processing. Further, the turning on and off of heating means, such as a heater provided for each of the liquid tank portion and the drying portion, is controlled in order to maintain the respective portions at desired temperatures.

In the conventional automatic developing machine, however, control of each of the heaters is executed completely independent of each other, with a possibility of simultaneous application of the power supplies for the respective heaters, so that the capacity of the machine is determined by the sum of the power supplies to be applied.

However, a recently developed automatic developing machine or a copying machine for a minilab requires that it be used under a rated household power supply of 100 V and 15A, which makes it necessary to reduce the power capacity of the machine.

Under these circumstances, there is disclosed in Japanese Patent Laid Open, Gazette No. 61-70557, a temperature control system for an automatic developing machine which is intended for reducing the power capacity.

In the above-mentioned system, a priority order is set in advance for a plurality of heaters provided in each of the liquid tank portion and the drying portion. At the same time, a heater activation period for a predetermined time, e.g., several seconds, is also prescribed. With such an arrangement, single cycles for the heating time of the heaters are allocated, in accordance with the priority order, to a combination of heater activation times which will not cumulate simultaneous activation of multiple heaters to exceed the rating limits.

However, in this system, heaters with a lower priority order will not be actuated within one cycle of the heater activation period even when they are required to be heated, and hence, the tanks or the drying portion with a lower priority order is forced to be sacrificed during a temperature stabilized period, so that maintenance of the temperature in an efficient manner fails to be accomplished.

SUMMARY OF THE INVENTION

The principal object of the present invention is to provide a temperature control method which is capable of carrying out a more efficient temperature control through an impartial and efficient actuating of a plurality of temperature control objects such as the respective heating means in the liquid tank portion and the drying portion of a developing device.

Such an object can be attained by the present invention which is described below.

Namely, the temperature control method of the present invention enables a plurality of heating means to be actuated within one cycle of a predetermined length of time.

In this case, it is preferable to provide allocated starting times based on a proportional plus integral plus derivative (PID) operation in at least one of the heating means of the temperature control objects.

Further, in the above case, it is preferable to set the one cycle based on the zero crossing of an AC power supply.

In the temperature control method of the present invention, there is allocated a required actuating time for each of the heating means within one cycle. As a result, it is possible to supply the required energy for each of the heating means in a well-balanced manner.

BRIEF DESCRIPTION OF THE DRAWINGS

FIG. 8 and FIG. 9 are flow charts for showing the procedure for the interruptions 1 and 2, respectively, which are generated by the heater control circuit of FIG. 4.

FIG. 10, FIG. 11, and FIG. 12 are time charts for showing the temperature conditioning profiles for the developing tank, the bleaching and fixing or the water washing tank, and the drying portion, respectively.

DETAILED DESCRIPTION OF THE PREFERRED EMBODIMENTS

Preferred embodiments of the invention will be described with reference to the accompanying drawings; however, it should be noted that the invention is not to be considered as limited thereby.

Figure 1:
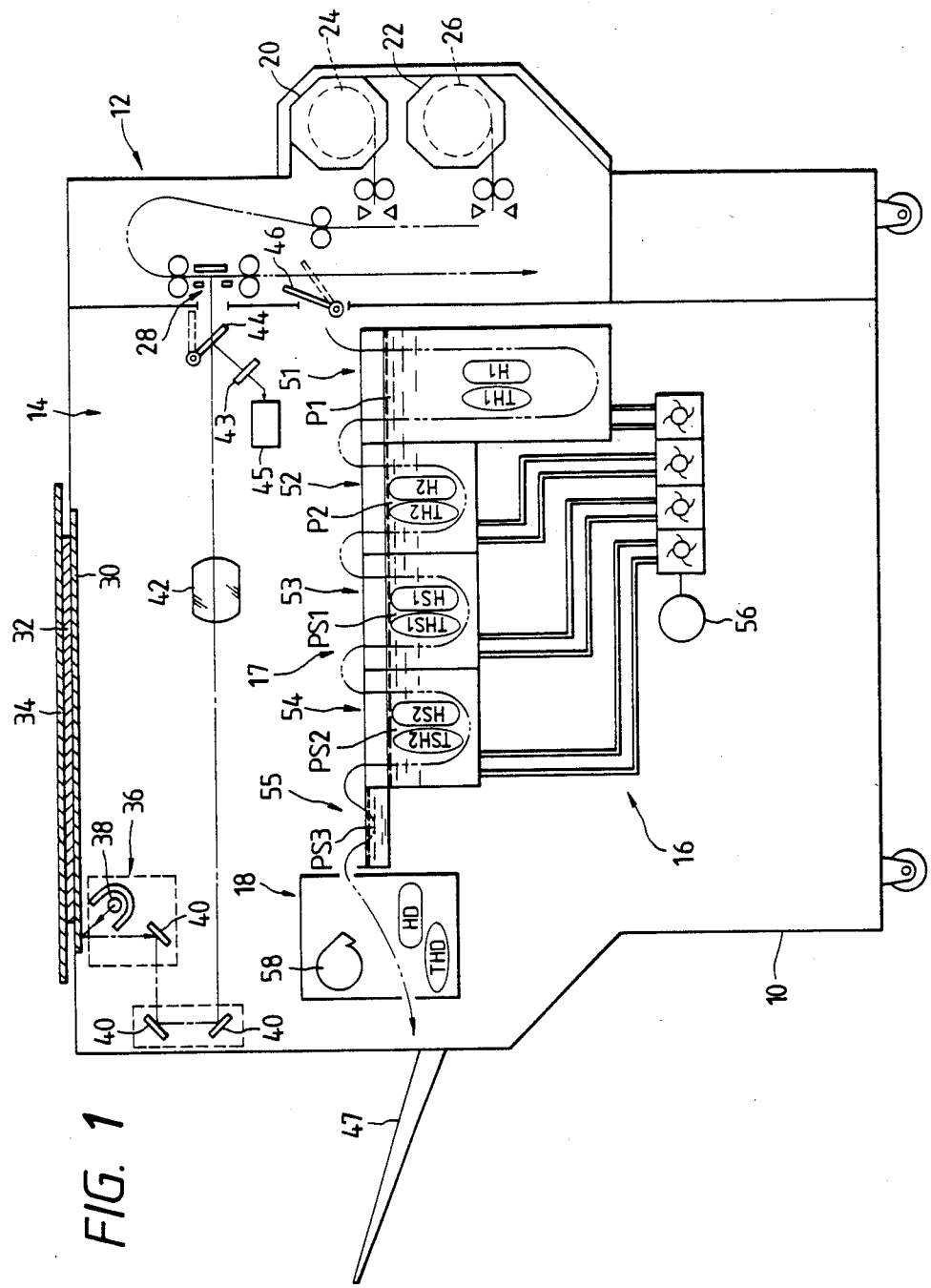
FIG. 1 is a sectional view illustrating an example of the image recording device of the present invention.

In FIG. 1 is shown a color copying machine of the silver salt photography type, which utilizes silver halide as the photosensitive material, as an example of an image recording device to which is applied the temperature control method of the present invention.

In a device main body 10, there are provided a paper feeding portion 12 to the right, an exposure portion 14 in the upper section, and a developing device 16 in the lower section, respectively. Further, in this silver salt photography type color copying machine, a pair of magazines 20 and 22 can be loaded in the vertical direction. In the interior of the respective magazines there can be housed photosensitive materials 24 and 26 which can be drawn out from their leading portions to the paper feeding portion 12. As an example, 24 may be an optimum photosensitive material for copying a color photographic original, while 26 may be an optimum photosensitive material for copying a color printed original.

The photosensitive material 24 or 26 which is pulled out of the magazine 20 or 22 is sent via the paper feeding part 12 to an exposure window 28 where it is exposed to the image of the color original 32 placed on a transparent platen 30 which is provided in the upper section of the exposure portion 14. The color original 32 is attached under pressure by an original cover 34 to the platen 30 to be illuminated by an exposure source 38 placed within a light source unit 36. An image of the color original 32 reflected by a plurality of mirrors 40 passes through an optical system 42 and is projected onto the photosensitive material 24 (or 26) located at the exposure window 28 when a shutter 44 is opened.

In the intermediate portion of the transporting locus (below the exposure window 28 of FIG. 1) of the photosensitive material 24 and 26, there is provided a switching guide 46 to switch the direction of the transportation of the photosensitive material 24 or 26 which is being forwarded vertically downward so as to guide it to a developing device 16 as needed. In the condition where the shutter 44 is closed, light reflected from a reference white plate and an original image are reflected by the shutter 44, and is measured photometrically with a plurality (6 in the present embodiment) of photosensors 43. The exposure control data is determined by the control device based on the reflection densities obtained by a white level value and a photometric value of the image (prescanning).

The developing device 16 consists of the liquid tank portion 17 and the drying portion 18.

In the liquid tank portion 17, there is usually provided, in side-by-side relationship, a developing tank P1 of a developing portion 51, a bleaching and fixing tank P2 of a bleaching and fixing portion 52, and first, second, and third water washing tanks PS1, PS2, and PS3 of first, second, and third water washing portions 53, 54, and 55.

The developing tank P1, the bleaching and fixing tank P2, and the water washing tanks PS1 and PS2 are sequentially stirred and circulated by a quadruple circulating pump 56.

Further, in the developing tank P1, the bleaching and fixing tank P2, and the first and second water washing tanks PS1 and PS2, there are arranged heaters H1, H2, HS1 and HS2 as the heating means and thermisters TH1, TH2, THS1, and THS2 as the temperature detecting means, respectively.

Here, it should be mentioned that the tank structure for the liquid tank portion 17 need not be limited to the example shown above, and various other known constructions can also be adopted.

The photosensitive material 24 (26), which has undergone the various stages of wet processing such as developing, bleaching and fixing, washing, and the like by means of the processing liquids held in the interior of the liquid tank portion 17, is sent next to the drying portion 18.

The drying portion 18 includes a heater HD as the heating means, a thermister THD as the temperature detecting means, and a drying fan 58. With the use of these components, drying is carried out after the various states of wet processing have taken place. The heating means may take the form of a heating roll, a hot plate, or the like.

The photosensitive material 24 (26) which has been dried in the drying portion 18 is then sent out to an ejection tray 47, thereby obtaining an image of the original.

Next, referring to FIG. 2, a heating control means 60 used in the developing device 16 and the image recording device of the present invention will be described.

Figure 2:
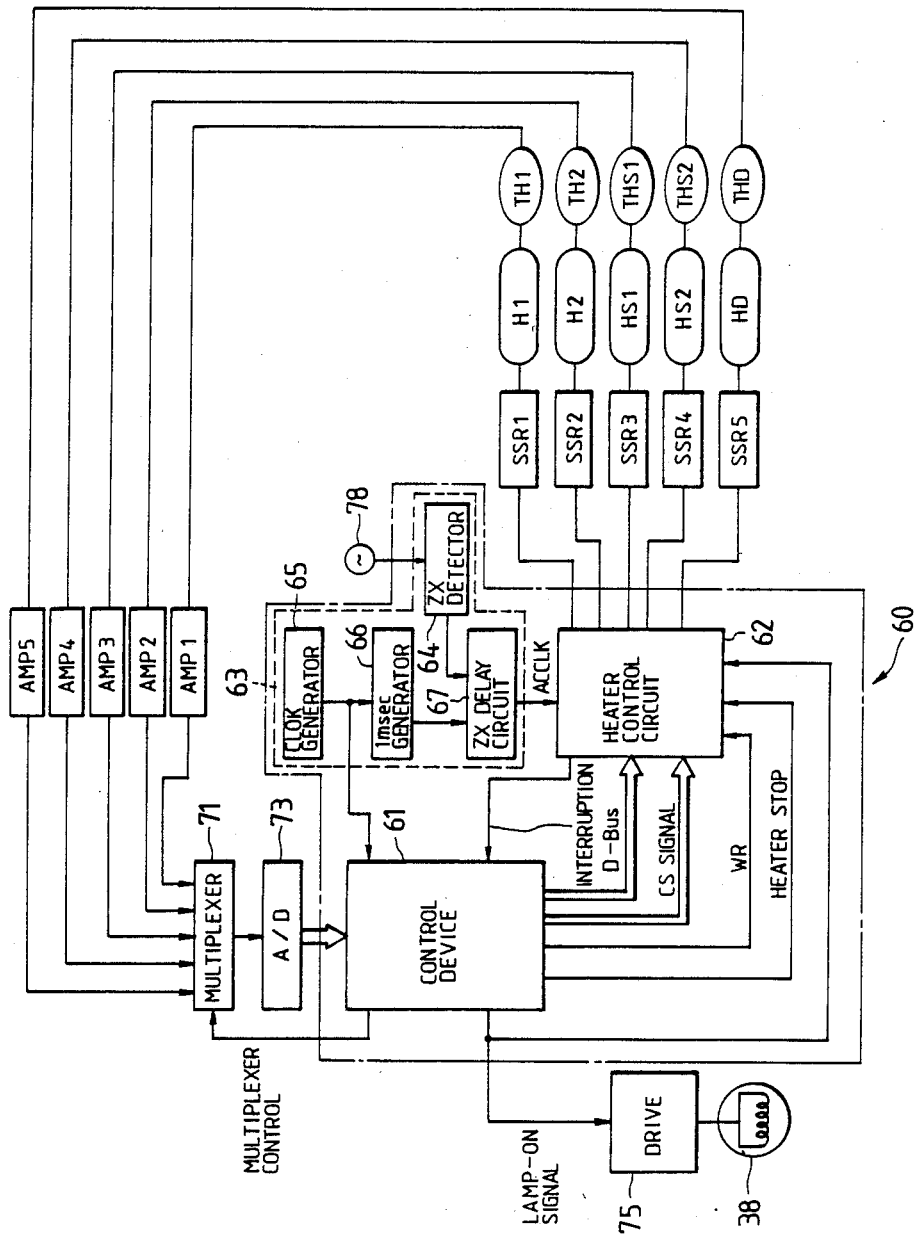
FIG. 2 is a block diagram for showing the heating control means of the present invention.

As shown in FIG. 2, signals from each of the tanks P1, P2, PS1, and PS2 of the liquid tank portion 17, and from each of the temperature detecting thermisters TH1, TH2, THS1, THS2, and THD are sent via the respective amplifiers AMP1, AMP2, AMP3, AMP4, and AMP5 to a multiplexer 71 as appropriate analog signals. The output side of the multiplexer 71 is connected to a control device 61 via an A/D converter 73.

The control device 61 is a microcomputer system which includes a CPU, RAM, ROM, input/output port, data bus, and control bus.

The control signal of the multiplexer 71 is outputted, the predetermined thermister signals (analog signals) are converted using an A/D converter 73, and a digital signal thus obtained is inputted into the control device 61.

The pulse generating portion 63 for the heating control means 60 of the present invention may take the form of various known clocks. The clock shown in the figure is a type which generates a delayed zero crossing (ZX) pulse by means of a ZX detector 64 and a delay which is sufficiently smaller than the ZX cycle. When the thermal time constants for the various tanks are controlled based on this method, it is preferable to construct the system so as to set about 2–2.5 seconds as the length of one cycle. For a temperature control system with smaller thermal time constants, the cycle length may be reduced to some extent.

Use of the delayed ZX pulse as the reference clock can prevent the accidental operation of the solid-state relays SSR1, SSR2, SSR3, SSR4, SSR5 and the like which perform the turning on and off of the heaters H1, H2, HS1, HS2 and HD, that will be described later. Such an accidental operation may be generated by an uncertain operation of the relays caused as a result of the varying quality of these elements, such as two relays remaining turned on concurrently for a one-half cycle when, for example, the relay SSR2 should originally have been turned on only after the relay SSR1 has been positively turned off.

In the example shown, the pulse generating part 63 consists of a ZX detector 64 connected to an AC power supply 78, a clock generator 65 for generating a clock signal of, for example, 11.0592 MHz (CPU reference clock), a unit time generator 66 connected to the clock generator 65 for generating a signal by frequency division, for example, a cycle of 1 m sec, and a ZX delay circuit 67 connected to the ZX detector 64 and the unit time generator 66 for generating a delayed ZX (AC CLK) signal.

A delayed ZX signal generated by the ZX delay circuit 67 is inputted to the heater control circuit 62, and a signal from the clock generator 65 is inputted to the control device 61.

Figure 3:
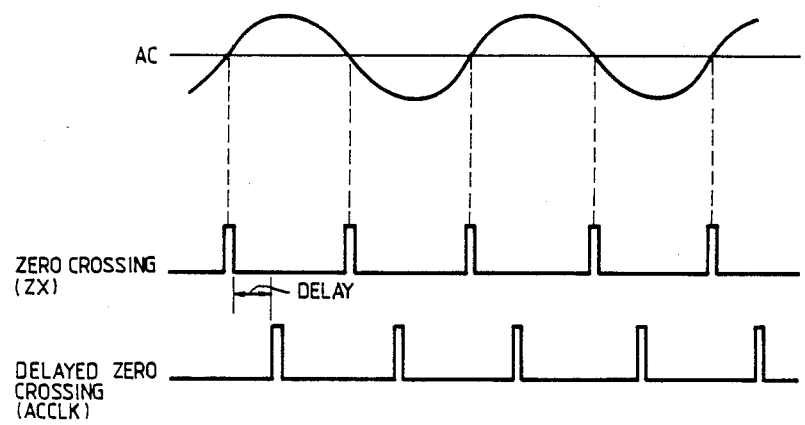
FIG. 3 is a time chart for explaining the operation of the pulse generating portion of the heating control means.

With such a configuration, when an AC signal is received from the AC power supply 78, the ZX detector 64 generates a ZX pulse signal as shown in FIG. 3. The ZX delay circuit 67 supplies a delayed ZX pulse (AC CLK) to the heater control circuit 62. A delay, for example, of 3–4 m sec is given to the ZX pulse signal, as shown in FIG. 3.

The heater control circuit 62 sets its cycle based on the delayed ZX pulse, and carries out temperature control for every one cycle as will be described later.

Next, a delayed ZX pulse from the ZX delay circuit 67 as well as a data bus signal (D-Bus) from the control device 61, a chip select (CS) signal generated in the address bus and the like, a (WR) signal for retrieving data on the data bus, and the like are inputted into the heater control circuit 62 provided in the heating control means 60. The heater control circuit 62 outputs an interruption signal to the control device 61 as will be described later. Further, circuit 62 outputs control signals to the solid-state relays SSR1, SSR2, SSR3, SSR4, and SSR5 which actuate the heaters H1, H2, HS1, HS2, and HD, respectively, of the liquid tank portion 17 and the drying portion 18.

It should be mentioned with respect to the example shown in FIG. 2, that the system is constructed such that a lamp-on signal is outputted from the control device 61 to a drive 75 for the exposure lamp 38 and to the heater control circuit 62. In addition, it is constructed so as to have a heater stop signal and the like to be outputted from the control device 61 to the heater control circuit 62.

Figure 4:
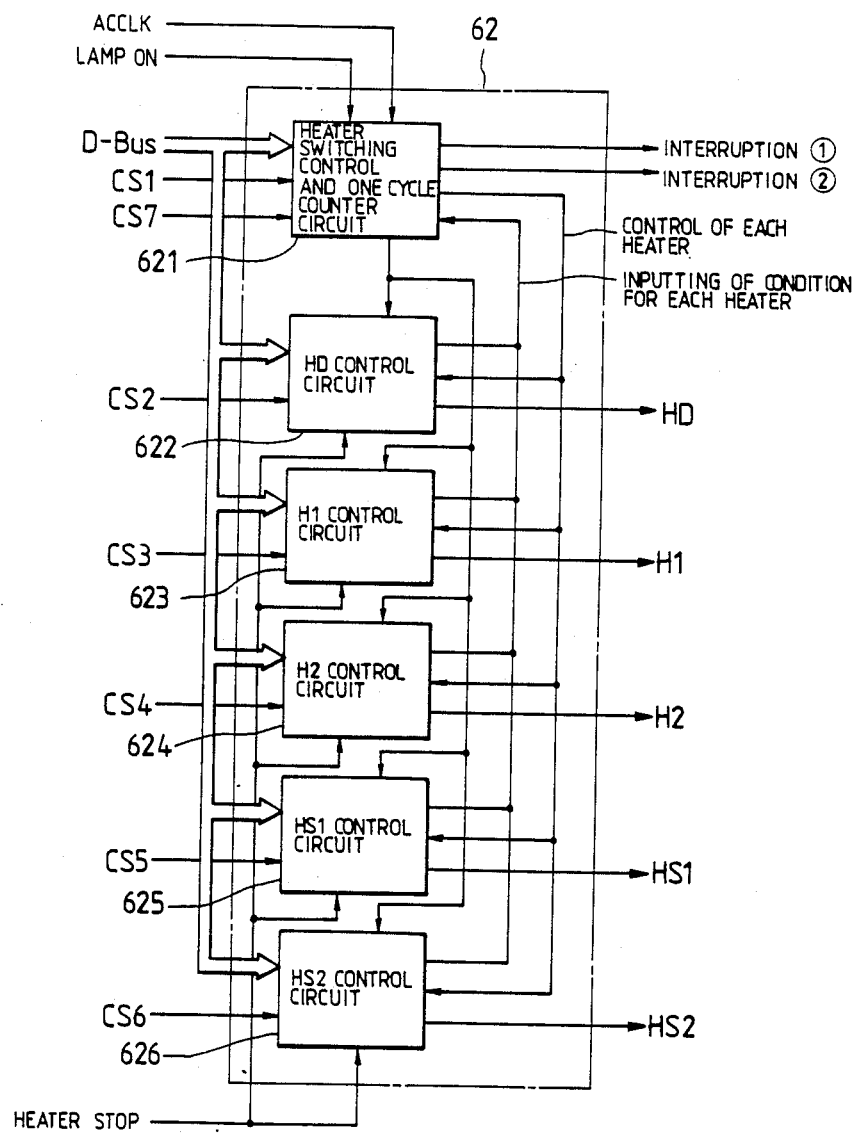
FIG. 4 is a block diagram for showing the heater control circuit of the heating control means in FIG. 2.

In FIG. 4 is shown the details of the heater control circuit 62.

The heater control circuit 62 of the present invention is in particular an AC line synchronizing circuit with a built-in gate array, having a heater switching control and one cycle circuit 621, an HD control circuit 622, an H1 control circuit 623, and H2 control circuit 624, an HS1 control circuit 625, and an HS2 control circuit as a control circuit for each of the heaters.

A delayed ZX pulse (AC CLK) is inputted into the heater switching control and one cycle counting circuit 621. Then, it becomes possible to set one cycle which corresponds to a predetermined pulse number of the delayed ZX pulse. When one cycle starts, the heater switching control and one cycle counter circuit 621 substracts or adds the counted number for one cycle in accordance with the inputted delayed ZX pulse, and outputs the interruption signals 1 and 2 to the control device 61 with predetermined timings.

Further, a data bus signal D-Bus and the chip select signals CS1 and CS7 are inputted to the heater switching control and one cycle counting circuit 621. Moreover, each of the control circuits 622-626 of the heaters HD-HS2 is connected to the circuit 621 which outputs, to centrally control the heaters, each of the heater control signals and a timing clock which is obtained by processing the AC CLK, and the condition of each heater is inputted to the circuit 621.

Moreover, a D-Bus signal and each of the chip select signals CS2-CS6 are inputted to each of the control circuit 622-626 of the heaters HD-HS2. In addition, a heater stop signal is arranged to be inputted to the control circuits 622-626 of the heaters HD-HS2, and the circuit 621 is constructed such that all of the heaters can be stopped immediately independently of the heater switching control and one cycle counter circuit 621.

Next, the temperature control procedure (temperature conditioning procedure) of the present invention will be described.

Figure 5:
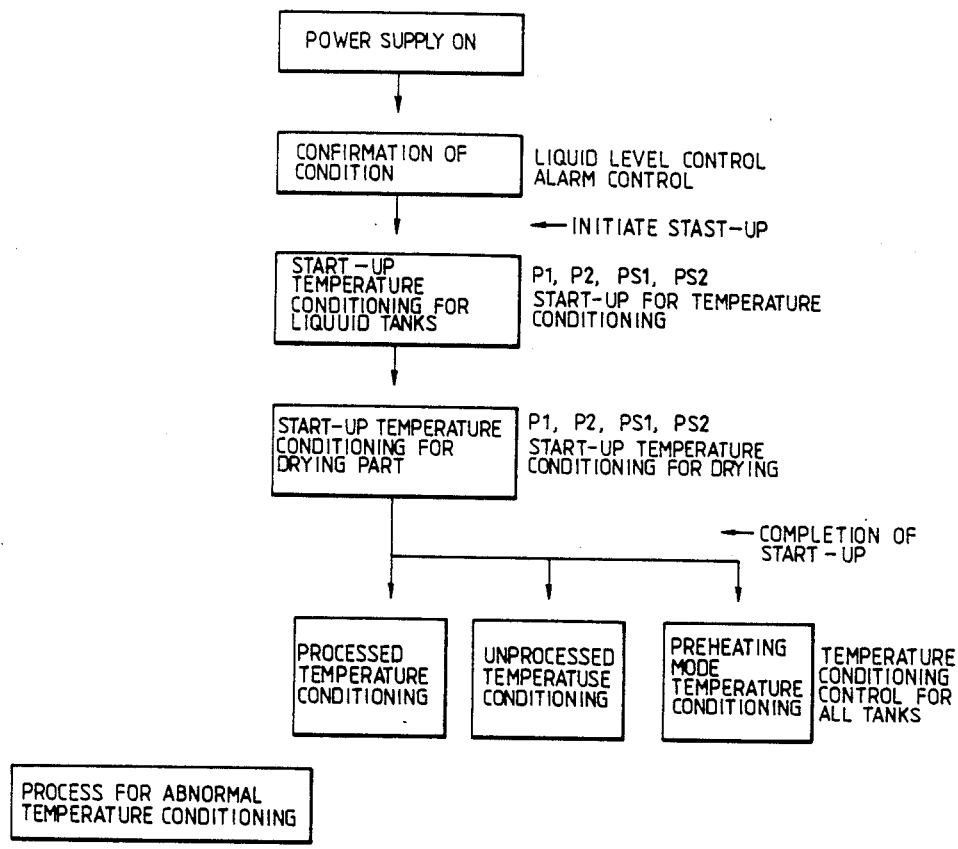
FIG. 5 is a flow chart showing the temperature conditioning procedure by means of the developing device of the present invention.

In FIG. 5 is shown a flow chart for the temperature conditioning.

First, when the power supply for the device is turned on, the conditions of the liquid level control and the alarm control of the liquid tank portion which will be described later, are confirmed.

Subsequent to the confirmation of the above-noted conditions, temperature conditioning for the liquid tank portion 17 is started up.

When the start-up for the temperature conditioning of the liquid tank portion 17 is completed, the temperature conditioning for each of the tanks P1-PS2 of the liquid tank portion is started, and at the same time the start-up for the temperature conditioning of the drying portion 18 is initiated.

With the completion of the start-up for the drying portion 18, one of the processed temperature conditioning, unprocessed temperature conditioning, and preheating mode temperature conditioning is initiated and the control of the temperature conditioning for all of the heaters H1, H2, HS1, HS2 and HD is carried out.

In this case, the processed temperature conditioning is to control, at the time of processing, all of the control objects, such as the respective heating means in the liquid tank portion and the drying portion, to the set target temperatures. An example, of the ranges of the set temperature are roughly: 38°±0.15° C. for the developing tank P1, 32°-38° C. for the bleaching and fixing tank P2, 28°-38° C. for the first and second water washing tanks PS1 and PS2, and 75°-85° C. for the drying part 18.

In addition, the unprocessed temperature conditioning also controls, at the start of the processing, the temperatures of the control objects to within the ranges of the set temperatures when the system reaches the intended process. The temperatures for the unprocessed temperature conditioning may be chosen to be identical to those of the processed temperature conditioning.

Moreover, the preheating mode temperature conditioning is a temperature conditioning carried out at the time of the preheating mode and is set from the operation panel, which is not shown, in response to the requirements of the user. It is set to the temperatures which takes into consideration the minimum allowable waiting time for the user.

Here, in such a temperature conditioning procedure, it is possible to introduce a processing for a temperature conditioning irregularity such as when the system goes into a warning range outside of the set temperature range.

To carry out or to start up each of the temperature conditionings in such a temperature conditioning procedure, the present invention makes it possible to actuate each of the required heaters and to allocate the actuating times of each of the heaters within one cycle of the heater switching control and one cycle counter circuit 621. The allocation of the heating times can be accomplished effectively by simultaneously actuating several heaters within the range of the rated power in response to the structure of the heating means of the heaters and the like.

Moreover, it is possible to supply the necessary energy to all of the required heaters for every cycle, so that all of the control objects can be controlled impartially, effectively, and efficiently.

Further, the execution can be made more efficient by retrieving the data from the temperature detecting means by generating the temperature measurement timings as an interruption 1 within one cycle, and then by carrying out the operation in a sufficiently long time which is greater than, for example, the duration of several ZX pulses to reset the heater outputs at the time of interruption (interruption ②) of a heater control completion signal.

The heater control structure can be switched automatically with a lamp-on signal of the exposure source 38.

Furthermore, during the execution of temperature conditioning, it is preferable to provide a blank time in which none of the heaters are actuated.

When this is done, it is convenient since it becomes possible to supply energy corresponding to the duration of the blank time as a lump to a tank whose temperature has dropped by a disturbance such as the addition of a replenishing liquid.

The capacity of each heater is designed by taking the above-noted situation into consideration.

Next, the procedure of temperature conditioning will be described in more detail by taking the processed temperature conditioning as an example.

Suppose that the capacities of the heaters H1, H2, HS1, HS2, and HD satisfy the relation $$HD > H1 > H2 \approx HS1 \approx HS2,$$

and that HD+HS1, HD+HS2, H1+H2+HS1 and H1+H2+HS2 lie within the rated capacity.

Further, suppose as an example that one cycle count consists of 8 bits (256 delayed ZX pulses)+8 delayed ZX pulses.

Figure 6:
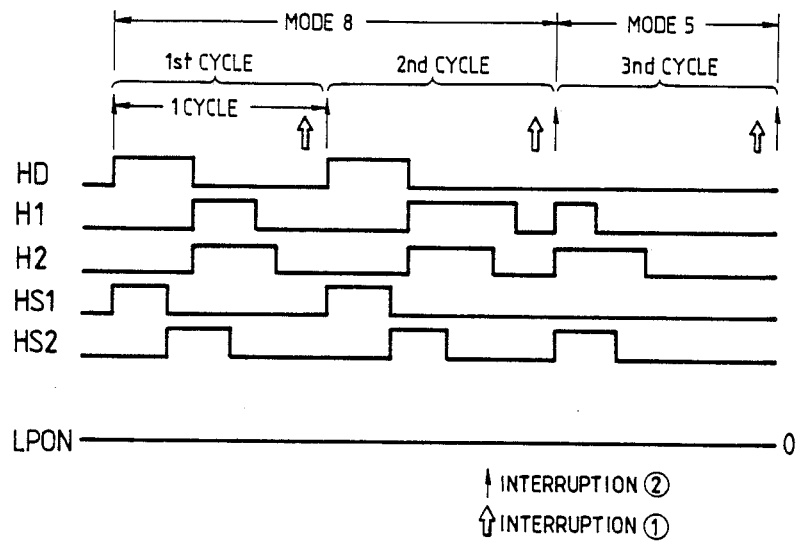
FIG. 6 and FIG. 7 are time charts for showing the temperature conditioning operation at the times of turning off and on, respectively, of an exposure source.
Figure 7:
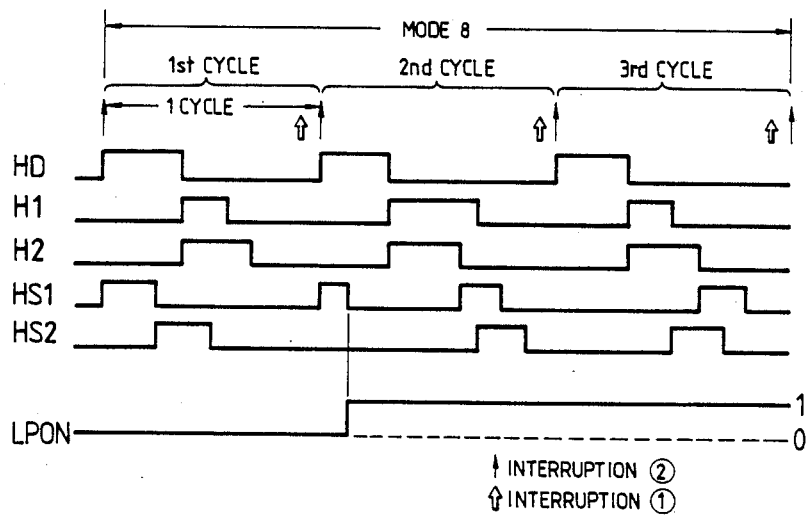

When one cycle is started, the heater switching control and one cycle counter circuit 621 substracts or adds the count number in accordance with the delayed ZX pulses. When the resultant value becomes equal to a predetermined set count number, an interruption ① is generated as shown in FIG. 6 and FIG. 7.

As shown in FIG. 8, the interruption ① is for measuring the temperature of the heaters HD–HS2, calculating and storing the result in the control device 61.

More specifically, first, the temperatures measured by the thermisters THD–THS2 are read into each of the heaters HD–HS2. In so doing, the signals of the thermisters THD–THS2 may be A/D converted for three consecutive times, for example, and their mean value may be used as the data for temperature conditioning.

Next, the heater control value for the on-count of each of the heaters HD–HS2 is calculated. As the control values for the respective heaters, such values can be employed to calculate the optimum on-count value necessary for all the heaters, and can set an 8-bit count, for example, for each heater.

In this case, the on-count operation for the heaters H2, HS1, HS2 and HD may be carried out as the ordinary on/off control. It should be noted, however, for the heater H1 that it is preferable to apply a PID control by considering the followability to a disturbance because of the narrow set temperature range in which the normal processing can be carried out. By the application of a PID control, it becomes possible to carry out a stable control with less degree of offset and hunting.

Deferring a detailed description of the PID control to a later section, in the control of the heater H1 in the preferred embodiment of the present invention, the length of the actuating time is varied for every cycle by the operation of the PID controlled output, as shown in FIG. 6. Further, for controlling the heaters H2–HD, all the heaters are actuated by the on/off control using actuating times with predetermined lengths.

Next, upon completion of calculation of the heater control value for the on-count of each heater, the control value is stored as each on-count number in a memory within the control device 61, as shown in FIG. 8, completing the processing corresponding to the interruption ① .

Subsequent to the completion of the processing for an interruption ① , an interruption ② is generated 8 pulse counts, for example, after generation of the signal for the interruption ① , as shown in FIG. 6 and FIG. 7. Upon completion of one cycle the next cycle is initiated.

In other words, in the interruption ② , first, the one cycle count number is set as shown in FIG. 9. Next, as shown, the on-count for each heater is set, and a start command is outputted to the heater switching control and one cycle counter circuit 621, one cycle is initiated by starting the control of each heater.

Further, a chip select signal CS7 is inputted to the heater switching control and one cycle counter circuit 621 to carry out a prescribed mode switching. For example, through combination with the value of 0 to 1 for the lamp-on signal of the exposure source, there can be prescribed the following modes depending upon the write data by the CS7 signal.

| LAMP ON (LPON) | Data Set by CS7 | Mode |
|---|---|---|
| 0 | 0 | HD + H1 |
|   | 1 | HD + H2 |
|   | 2 | HD + HS1 |
|   | 3 | HD + HS2 |
|   | 4 | H1 + H2 + HS1 |
|   | 5 | H1 + H2 + HS2 |
|   | 6 | |
|   | 7 | |
|   | 8 | 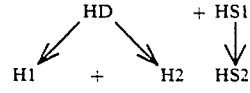 |
| 1 | 0~3 | HD |
|   | 4 | H1 + H2 |
|   | 5 | |
|   | 6 | |
|   | 7 | |
|   | 8 | 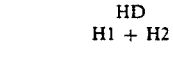 |

To explain the case of lamp-on value of 0 for the processed temperature conditioning, mode 8 of CS7 is selected and each of the heaters HD, H1, . . ., HS2 is actuated within each cycle according to the time chart as shown in FIG. 6.

In the example shown in FIG. 6, actuation is commanded to the heaters HD, H2, HS1 and HS2 because of their temperatures being lower than the set temperature. In addition, the length of the starting time for the heater H1 is varied by the operation of PID controlled output. An example is shown wherein the heaters HD and HS1 achieved the set temperature in the second cycle by the mode 8 of CS7.

In contrast, a time chart for the case of value 1 for the lamp-on signal is shown in FIG. 7.

In the example shown in FIG. 7, the lamp-on signal went to 1 in the second cycle, and as a result the exposure source was lighted for several seconds, the lamp-on signal of 1 was inputted in the state of mode 8 of CS7, and the remaining actuating count of HS1 was postponed, changing the structure of heater control.

In the examples described in the above, a blank time is provided before the completion of each of the cycles.

Next, the temperature conditioning of the developing tank P1 will be described in more detail.

In FIG. 10 is shown a profile of temperature conditioning for the tank P1.

As mentioned earlier, a PID control is applied during the execution of the processed temperature conditioning.

The controlled output value OT in the PID control is computed according to the following formula.

$$OT = \frac{100}{KP}\left(DV + \frac{TC}{KI}(RI + DV) - \frac{KD}{TC}(PV_1 - PV_2)\right) + SV.$$

The symbols used in the above equation are defined as below:

DV = SV − PV (°C.)
PV: control variable (°C.) (Subscripts 1 and 2 refer to the present time and the previous time, respectively.)
SV: set value (°C.)
KP: proportional band (%)
KI: integral action time (sec)
KD: derivative action time (sec)
TC: control cycle (sec)
RI: polarizing integral (°C.)

In order to derive the duty ratios for the heaters from the value of OT computed as in the above, first, a power with an appropriate duty ratio is applied to the heater H1, and a duty ratio D (%) for which the liquid temperature becomes 60°–70° C. is determined in an open loop. Then, the room temperature Ta (°C.) and the liquid temperature $T_{P1}$ (°C.) are measured when the liquid temperature is saturated sufficiently.

Then, from the above data, duty ratio D' for raising the temperature by 1° C. is determined by the formula D' = D/($T_{P1}$ − Ta), and the output duty ratio DOT (%) is found by $D_{OT}$ = OT × D'.

The constants KP, KI and KD need only be determined by setting a P action (proportional action) to a maximum value and an I action (integral action) and a D action (derivative action) to minimum values, based on the known Ziegler-Nichols' critical sensitivity method.

As shown in FIG. 10, by the above PID control there is carried out a processed temperature conditioning for the tank P1 which has the set value SV as the center for a set range MH–ML.

It should be noted in the example shown in FIG. 10 that the start-up for the temperature conditioning for the tank P1 and for the temperature conditioning for drying is carried out by the on/off control by means of the CS7 signals for the modes 4 and 5 and for the modes 0–3. Needless to say, it can be replaced by the on/off control by means of the CS7 signal of the mode 8 or by the PID control described above.

Further, the profiles for the temperature conditioning for the tanks P2, PS1 and PS2 are shown in FIG. 11.

The difference of these cases from that of the tank P1 lies in that an ordinary conditioning for the processed temperature conditioning is carried out by the on/off control that has a set value SV as the threshold and that a preheating mode temperature conditioning is added further. The PID control may also be applied to these tanks.

Moreover, a profile for temperature conditioning for the drying portion 18 is shown in FIG. 12. In this case, it is similar to the preceding case in that an on/off control with a set value SV as the threshold is applied. However, the on/off control may be carried out by an intermittent air-blowing in which air is blown at the time of start-up the heater HD and stopping the air-blowing at a predetermined time after turning off the heater HD. In this case, too, the PID control may be adopted.

In each of the temperature conditioning methods described in the above, it is preferable to construct the system so as to issue a warning alarm, and turn off the power supply for the heaters and the like when the temperature of the liquid which is heated up falls outside of the set range of temperatures MH–ML for over a set length of time continuously or when the temperature falls outside of the temperature range EH–EL even momentarily, as shown in FIG. 10.

Further, it is preferable to construct the system so as to issue an alarm for heater disconnection, for sensor malfunction, and the like.

Moreover, for the case of controlling the control objects with smaller thermal time constants in the above examples, effects similar to the above can be obtained by utilizing a power supply obtainable by frequency converting the commercially available power supply.

According to the present invention, the actuating times for the required heating means are allocated within one cycle of the system so that it is possible to supply the required energy to all of the heating means, and to control each of the control objects impartially and efficiently. As a result, a developing device is realized which is capable of carrying out an effective as well as an efficient temperature conditioning and an image recording device and the like which employs such a developing device.

The present invention is useful when it is applied to various kinds of systems with wet type processing in addition to the developing device and the copying machine of the silver salt photography type described above.

In addition, it is useful for various kinds of temperature control for the cases when there are a plurality of temperature control objects.

What is claimed is:

1. In a temperature control method using a heating means and a temperature detecting means for each of a plurality of objects which are temperature controlled according to sequential, predetermined intervals of time designated as heater switching control cycles, said method comprising the steps of:

(a) controlling the heating of each of said heating means, for each cycle of said heater switching control cycles, by measuring and storing a temperature of each of said objects using said temperature detecting means, and in response thereto, allocating a specific length of actuating time and a specific cycle portion for controlling a heating means of each respective object, such that a total energy requirement for activating a subset of said heating means at any given time during said each cycle is maintained within a range of a predetermined rated capacity; and (b) actuating each of said heating means according to said specific length of actuating time and said specific cycle portion.

2. A temperature control method according to claim 1, wherein said heating means of at least one of the temperature control objects is given an allocated actuating time based on a proportional plus integral plus derivative (PID) control operation.

3. A temperature control method according to claim 1 or claim 2, wherein said heater switching control cycles are set based on the detection of a zero crossing of an AC power supply signal.

4. In a temperature control method for a developing device for carrying out a wet processing of a photosensitive material, said developing device including a heating means and a temperature detecting means for each of a plurality of liquid tanks of a liquid tank portion and a drying portion, said method for effecting temperature control according to sequential, predetermined intervals of time designated as heater switching control cycles, and comprising the steps of:

(a) controlling the heating of said heating means for each of said liquid tanks and said drying portion, for each cycle of said heater switching control cycles, by measuring and storing a temperature of each of said liquid tanks and drying portion using said temperature detecting means, and in response thereto, allocating a specific length of actuating time and a specific cycle portion for controlling a heating means of each respective said liquid tanks and drying portion, such that a total energy requirement for activating a subset of said heating means at any given time during said each cycle is maintained within a range of a predetermined rated capacity; and (b) actuating each of said heating means according to said specific length of actuating time and said specific cycle portion.

5. A temperature control method according to claim 4, wherein said heating means of at least one of said liquid tanks or drying portion is given an allocated actuating time based on a proportional plus integral plus derivative (PID) control operation.

6. A temperature control method according to claim 4 or claim 5, wherein said heater switching control cycles are set based on the detection of a zero crossing of an AC power supply signal.

* * * * *